United States Patent

Morisawa et al.

Patent Number: 5,478,291
Date of Patent: Dec. 26, 1995

[54] GEAR SHIFT SYSTEM FOR AUTOMATIC TRANSMISSION

[75] Inventors: Kunio Morisawa; Ryuji Ibaraki; Hideaki Otsubo, all of Toyota, Japan

[73] Assignee: Toyota Jidosha Kabushiki Kaisha, Toyota, Japan

[21] Appl. No.: 210,290

[22] Filed: Mar. 18, 1994

[30] Foreign Application Priority Data

Mar. 19, 1993 [JP] Japan .................. 5-085564
Oct. 25, 1993 [JP] Japan .................. 5-288752
Nov. 15, 1993 [JP] Japan .................. 5-308666

[51] Int. Cl.$^6$ .................. F16H 3/62
[52] U.S. Cl. .......... 475/148; 475/144; 475/281
[58] Field of Search .................. 475/148, 116, 475/144, 146, 281

[56] References Cited

U.S. PATENT DOCUMENTS

| | | |
|---|---|---|
| 4,089,238 | 5/1978 | Forster et al. . |
| 4,274,303 | 6/1981 | Shindo et al. . |
| 4,438,663 | 3/1984 | Eichenberger et al. ............ 475/347 X |
| 5,083,992 | 1/1992 | Asada ...................... 475/278 |
| 5,113,725 | 5/1992 | Tomomatsu et al. ............... 475/116 X |
| 5,120,284 | 6/1992 | Asada ...................... 475/278 |

FOREIGN PATENT DOCUMENTS

| | | |
|---|---|---|
| 0305045 | 3/1989 | European Pat. Off. . |
| 0418426 | 3/1991 | European Pat. Off. . |
| 56-55744 | 5/1956 | Japan . |
| 1-312267 | 12/1989 | Japan . |
| 1308005 | 2/1973 | United Kingdom . |
| 1308008 | 2/1973 | United Kingdom . |

Primary Examiner—Charles A. Marmor
Assistant Examiner—Peter Kwon
Attorney, Agent, or Firm—Oblon, Spivak, McClelland, Maier & Neustadt

[57] ABSTRACT

A gear shift system for an automatic transmission, in which a plurality of planetary gear sets arrayed on a common axis and each including a plurality of rotating elements are arranged in a casing, and in which an extension housing is attached to the axial end portion of the casing. The gear shift system comprises: a one-way clutch arranged in the extension housing for selectively fixing the rotating elements of a predetermined one of the planetary gear sets arranged at the end side of the casing; and a multi-disc brake in a parallel relation to the one-way clutch.

9 Claims, 8 Drawing Sheets

|      | K1 | K2 | K0 | B0 | B1 | B2 | B3 | B4 | F0 | F1 | F2 |
|------|----|----|----|----|----|----|----|----|----|----|----|
| 1ST  | ○  |    | ○  |    |    |    |    | ◎  | ○  |    | ○  |
| 2ND  | ○  |    | ○  |    |    |    | ○  |    | ○  |    |    |
| 3RD  | ○  |    | ○  |    | ◎  | ○  |    |    | ○  | ○  |    |
| 4TH  | ○  | ○  | ○  |    |    |    |    |    | ○  |    |    |
| 5TH  | ○  | ○  |    | ○  |    |    |    |    |    |    |    |
| Rev  |    | ○  | ○  |    |    |    |    | ○  |    |    |    |

|      | K1 | K2 | K0 | B0 | B1 | B2 | B3 | B4 | B5 | F0 | F1 | F2 |
|------|----|----|----|----|----|----|----|----|----|----|----|----|
| 1ST  | ○  |    | ○  |    |    |    |    | ○  | ◎  | ○  |    | ○  |
| 2ND  | ○  |    | ○  |    |    |    | ○  |    |    | ○  |    |    |
| 3RD  | ○  |    | ○  |    | ◎  | ○  |    |    |    | ○  | ○  |    |
| 4TH  | ○  | ○  | ○  |    |    |    |    |    |    | ○  |    |    |
| 5TH  |    | ○  |    | ○  |    |    |    |    |    |    |    |    |
| REV  |    | ○  | ○  |    |    |    | ○  |    |    |    |    |    | ized if its accommodation in the casing is to be improved whereas its size has to be enlarged if a sufficient rigidity is to be ensured. Since, moreover, the piston is formed with the projection extending through a portion of the outer race of the one-way clutch for pushing the brake disc and the brake plate, it is difficult to retain the rigidity at its projection and to push the brake disc and the brake plate completely uniformly around their circumferences. This results in still another disadvantage that the torque capacity may fall short or that an offset wear may occur.

GEAR SHIFT SYSTEM FOR AUTOMATIC TRANSMISSION

BACKGROUND OF THE INVENTION

The present invention relates to a gear shift system to be used in an automatic transmission for a vehicle.

Both a plurality of planetary gear sets constructing the gear train of the automatic transmission for a vehicle, and frictional engage elements such as clutches or brakes for connecting or fixing the rotating elements of the planetary gear sets selectively are generally accommodated in an integral casing. Moreover, a speed meter gear and a bearing for an output shaft may be accommodated in an extension housing connected to an end portion of the casing, as disclosed in Japanese Patent Laid-Open No. 126174/1993, for example.

This construction will be briefly described in the following. The casing is formed at its rear end portion (as located at the opposite side to the torque converter) with a wall portion which is projected to the radial center. There are provided a multi-disc brake and a one-way clutch for selectively fixing the ring gears of planetary gear sets arranged close to that wall portion. The multi-disc brake has a brake hub made of the ring gear and a brake drum made of the casing such that the brake disc is splined to the outer circumference of the ring gear whereas the brake plate is splined to the inner circumference of the casing. On the other hand, the one-way clutch is arranged between the aforementioned planetary gear set and the wall portion such that its inner race is connected to the aforementioned ring gear and its outer race splined to the inner circumference of the casing. Moreover, the piston for applying the aforementioned multi-disc brake is reciprocally fitted in the aforementioned wall portion. As a result, the piston is formed into a cylindrical shape covering the aforementioned one-way clutch and has its leading end portion formed with a projection which is projected toward the multi-disc brake through a portion of the outer race of the one-way clutch.

As a result, in the gear shift system of the prior art described above, the rotation of the ring gear in a predetermined direction is blocked by applying the one-way clutch, and the piston is moved forward to apply the multi-disc brake to connect and fix the ring gear to the casing. Thus, the reaction at the time of blocking the rotation of the ring gear is received by the casing.

In the gear shift system of the prior art, the piston for applying the multi-disc brake is arranged across the one-way clutch so that it has to be extended toward the multi-disc brake around the one-way clutch. As a result, the casing is radially so enlarged as to cause a disadvantage that the clearance between it and the body is decreased. Since the piston is given the cylindrical shape, there arises another disadvantage that its rigidity has to be sacrificed if its accommodation in the casing is to be improved whereas its size has to be enlarged if a sufficient rigidity is to be ensured. Since, moreover, the piston is formed with the projection extending through a portion of the outer race of the one-way clutch for pushing the brake disc and the brake plate, it is difficult to retain the rigidity at its projection and to push the brake disc and the brake plate completely uniformly around their circumferences. This results in still another disadvantage that the torque capacity may fall short or that an offset wear may occur.

On the other hand, the planetary gear sets are always fed with lubricating oil. Since the aforementioned gear shift system of the prior art is arranged therearound with the multi-disc brake, this multi-disc brake is always fed with much lubricating oil. Moreover, this multi-disc brake is released at the 4th forward speed which is frequently used. Thus, the dragging torque due to the much lubricating oil may be excessively increased to invite a further disadvantage in the reduction of the power loss or in the improvement of mileage. The aforementioned excessive supply of the lubricating oil to the multi-disc brake is also caused by the fact that the piston has a cylindrical shape covering around the one-way clutch, such that the lubricating oil at the inner circumference of the piston is splashed therealong toward the multi-disc brake by the centrifugal force. As a result, the lubricating oil to the multi-disc brake is oversupplied. Still moreover, the structure of the prior art described above has to be made by such complicated works in the deepest portions of the casing that the piston is fitted in the wall portion formed at the axial end portion of the casing, and that the one-way clutch is then fitted while threading the projection of the piston, as desired. Thus, the gear shift system of the prior art is inferior in its assembling works.

On the other hand, generally speaking, the automatic transmission using the planetary gear sets can provide the more gear stages if the number of planetary gear sets and the number of frictional engagement elements for connecting the components of the gear sets selectively grow the larger. However, the increase in the numbers of the planetary gear sets and the frictional engage elements will cause a disadvantage that the total length of the automatic transmission is enlarged. In the prior art, therefore, the frictional engage elements for connecting the components of the existing planetary gear sets selectively are arranged around the existing planetary gear sets. The automatic transmission of this construction can increase the number of gear stages to be set. However, the planetary gear sets have their external diameters restricted so that their gear ratios (i.e., the ratios of the tooth number of the sun gears to the tooth numbers of the ring gears) may not be made higher. As a result, a specific automatic transmission having an overdrive planetary gear set and underdrive planetary gear sets has to bring the overdrive planetary gear set to an overdrive state when a reverse stage is to be set, so that it has a problem of having its shift controls complicated.

SUMMARY OF THE INVENTION

A major object of the present invention is to reduce the size of a gear shift system for an automatic transmission for a vehicle.

Another object of the present invention is to reduce the power loss due to the dragging of frictional engage elements.

Still another object of the present invention is to give higher gear ratios to planetary gear sets without reducing the number of gear stages to be set.

A further object of the present invention is to effect a higher gear ratio at a reverse stage.

According to an aspect of the present invention, there is a gear shift system for an automatic transmission, in which a plurality of planetary gear sets arrayed on a common axis and each including a plurality of rotating elements are arranged in a casing, and in which an extension housing is attached to the axial end portion of said casing, which system comprises: a one-way clutch arranged in said extension housing for selectively fixing the rotating elements of a predetermined one of said planetary gear sets arranged at the end side of said casing; and a multi-disc brake in a parallel relation to said one-way clutch.

The aforementioned multi-disc brake may be arranged in said extension housing.

As a result, no interference is invited between the one-way clutch accommodated in the extension housing and the hydraulic servo mechanism for the multi-disc brake so that many members are not radially arranged. As a result, the gear shift system can be radially small-sized.

If, moreover, the multi-disc brake is arranged in the extension housing, no excess lubricating oil is supplied to the multi-disc brake so that its drag torque can be reduced to suppress the power loss.

According to another aspect of the present invention, there is provided a gear shift system for an automatic transmission for changing the ratio of numbers of revolutions of an input shaft and output shaft, which are arrayed on a common axis, by a plurality of planetary gear sets arranged between said input shaft and said output shaft, which system comprises: a first planetary gear set of single pinion type arranged close to said input shaft and including a sun gear, a ring gear and a carrier; a second planetary gear set of single pinion type arranged at the opposite side to said input shaft with respect to said first planetary gear set and including a sun gear, a ring gear and a carrier; a third planetary gear set arranged close to said output shaft than said second planetary gear set and including a sun gear, a ring gear and a carrier connected to said output shaft; a first connecting shaft arranged on the same axis as that of said input shaft and said output shaft and integrally connecting the sun gear of said third planetary gear set and the sun gear of said first planetary gear set; a second connecting shaft made of a quill arranged concentrically around said first connecting shaft and integrally connecting the carrier of said first planetary gear set and the ring gear of said second planetary gear set; a third connecting shaft made of a quill arranged concentrically around said second connecting shaft and integrally connecting the sun gear of said first planetary gear set and the sun gear of said second planetary gear set; first clutch means arranged closer to said input shaft than said first planetary gear set for connecting the ring gear of said first planetary gear set and said input shaft selectively; second clutch means arranged closer to said input shaft than said first planetary gear set for connecting the sun gear of said first planetary gear set and said input shaft selectively; first brake means for braking the rotations of the sun gear of said first planetary gear set and the sun gear of said second planetary gear set selectively; second brake means for braking the rotations of said sun gears selectively in a predetermined direction; third brake means for braking the rotation of the carrier of said second planetary gear set selectively; and fourth brake means for braking the rotation of the ring gear of said third planetary gear set selectively.

As a result, it is possible to set gear stages of five forward and one reverse stages and to increase the gear ratio at the reverse stage. Moreover, the gear shift system has its diametrical size reduced.

According to the present invention, moreover, the gear shift system can further comprises: a casing covering the entire outer circumference of said gear shift system and having a support portion projected toward the center axis of said first connecting shaft; and a thrust bearing arranged between one end portion of said first connecting shaft and said support means for supporting said first connecting shaft in the axial direction thereof.

According to this modification, the thrust bearing can be small-sized to reduce the total length of the gear shift system.

The above and further objects and novel features of the present invention will more fully appear from the following detailed description when the same is read in connection with the accompanying drawings. It is to be expressly understood, however, that the drawings are for purpose of illustration only and are not intended as a definition of the limits of the invention.

DETAILED DESCRIPTION OF THE PREFERRED EMBODIMENTS

Figure 1:
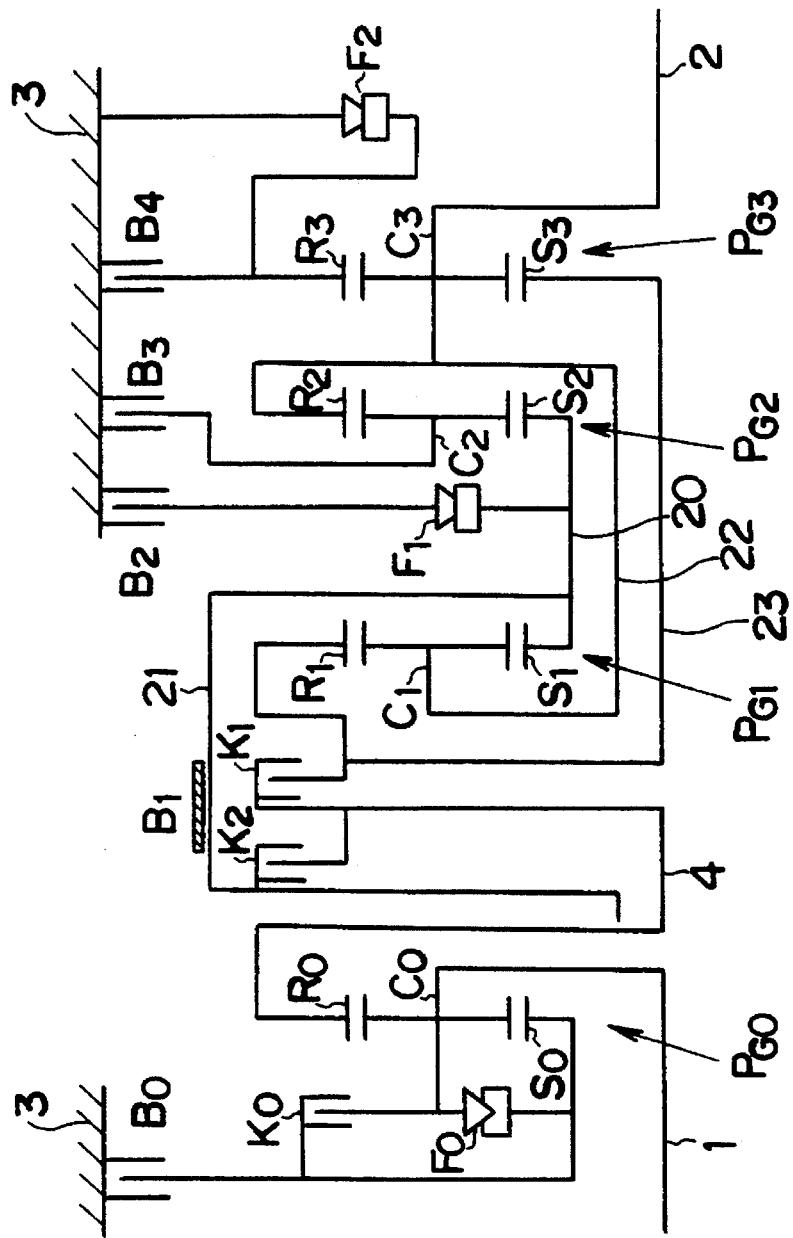
FIG. 1 is a skeleton diagram schematically showing a gear shift system according to a first embodiment of the present invention.

Here will be described a gear shift system according to the present invention. FIG. 1 is a skeleton diagram showing one embodiment of the present invention. The gear shift system according to the present embodiment is constructed to include a single pinion type planetary gear set PG0 for an O/D (overdrive) stage and first to third single pinion type planetary gear sets PG1 to PG3. These first to third planetary gear sets PG1 to PG3 are provided for establishing an underdrive stage and arrayed in the recited order of PG1, PG2 and PG3, as taken from the side of an input shaft 1.

Specifically, the O/D planetary gear set PG0 is arranged at the side of the input shaft 1 such that a carrier C0 is connected to the input shaft 1. Between the carrier C0 and a sun gear S0, there are arranged a multi-disc clutch K0 and a one-way clutch F0, which are in parallel relation to each other. On the other hand, a multi-disc brake B0 for fixing the sun gear S0 selectively is interposed between the sun gear S0 and a casing 3. Moreover, the O/D planetary gear set PG0 has a ring gear R0 so connected to an intermediate shaft 4 which is arranged on an extension of the input shaft 1, such that it may rotate together. To this intermediate shaft 4, there are connected to rotate together: the drum portion of a first clutch K1 of a multi-disc clutch acting as first clutch means; and the hub portion of a second clutch K2 of a multi-disc clutch acting as second clutch means.

These clutches K1 and K2 are arranged in the order of K2 and K1, as taken from the side of the input shaft 1. Adjacent to this first clutch K1, there is arranged the first planetary gear set PG1, which has a sun gear S1 formed on the outer circumference of a sun gear shaft 20. The second clutch K2, as located at the side of the O/D planetary gear set PG0, has a drum portion 21 extended from the first planetary gear set PG1 to an output shaft 2 while covering the first clutch K1 and the first planetary gear set PG1 so long that it is so connected to the sun gear shaft 20 as to rotate together. Around the outer circumference of the drum portion 21, moreover, there is arranged a first brake B1 of a band brake acting as first brake means.

Between the first planetary gear set PG1 and the second planetary gear set PG2, there are arranged a one-way clutch F1 acting as second brake means and a second brake B2 made of a multi-disc brake. Specifically, the second planetary gear set PG2 has a sun gear S2 fixed on the end portion of the sun gear shaft 20 at the side of the output shaft 2 so that it is so connected to the sun gear S1 of the first planetary gear set PG1 as to rotate together. The one-way clutch F1 and the second brake B2 are so arranged between the sun gear shaft 20 and the casing 3 as to take a series relation to each other. Moreover, the second planetary gear set PG2 has a carrier C2 selectively fixed by a third brake B3 of a multi-disc brake acting as third brake means. This third brake B3 is arranged around the outer circumference of the second planetary gear set PG2.

Moreover, the second planetary gear set PG2 has a ring gear R2 connected to a carrier C1 of the first planetary gear set PG1. This connection is effected by a connecting shaft 22 which is inserted in the sun gear shaft 20.

The third planetary gear set PG3 is arranged adjacnet to the second planetary gear set PG2 and has a carrier C3 connected to the ring gear R2 of the second planetary gear set PG2. Moreover, the third planetary gear set PG3 has a sun gear S3 connected to the ring gear R1 of the first planetary gear set PG1. This connection is effected by a connecting shaft 23 is coaxially inserted in the aforementioned connecting shaft 22. Still moreover, the third planetary gear set PG3 has a ring gear R3 selectively fixed by fourth means, which is composed of a one-way clutch F2 and a fourth brake B4 of a multi-disc brake.

Figure 2:
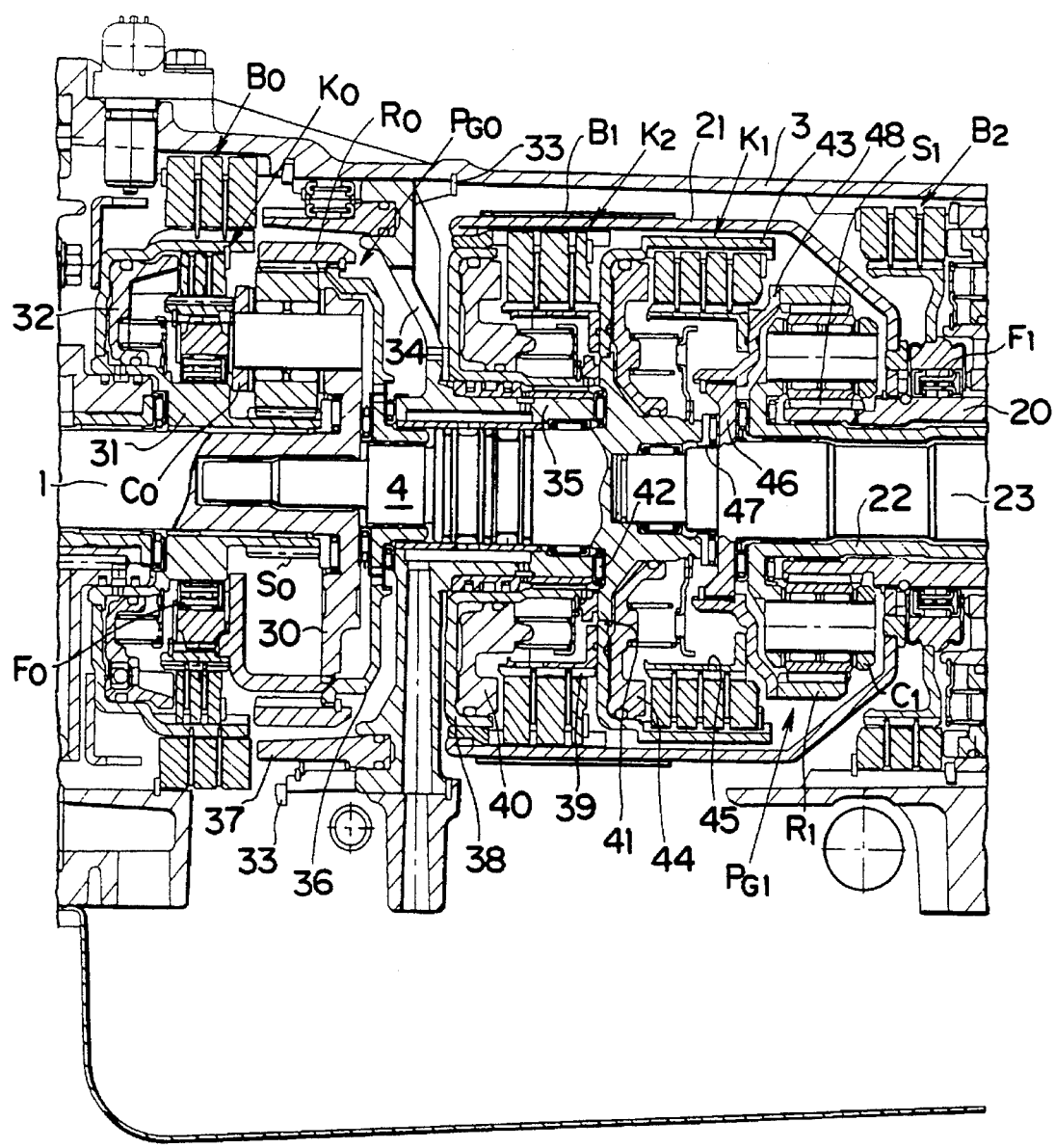
FIG. 2 is a section showing one portion of the gear shift system of FIG. 1 more specifically.
Figure 3:
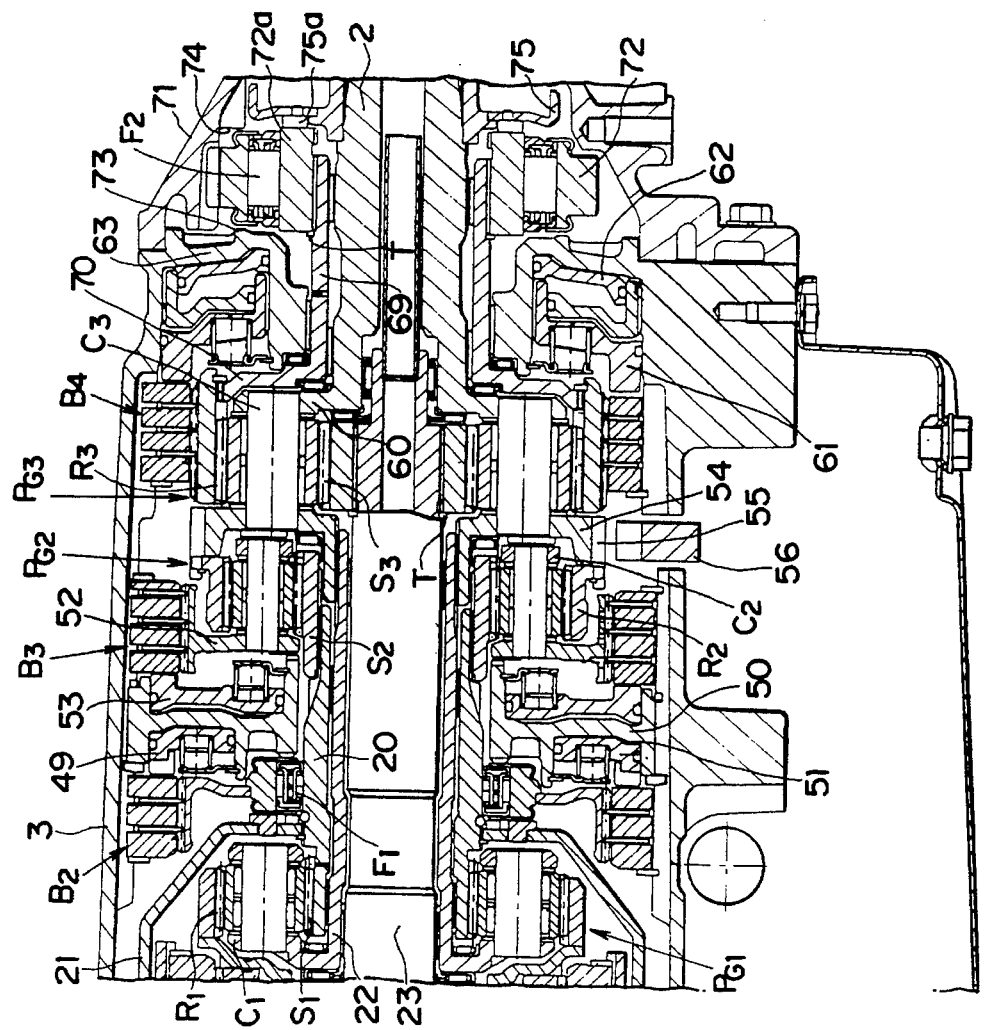
FIG. 3 is also a section but shows another portion of the gear shift system of FIG. 1 more specifically.

The gear shift system shown in FIG. 1 is more specifically shown in FIGS. 2 and 3. Incidentally, the area of illustration limits FIG. 2 to one half at the side of the input shaft 1 and FIG. 3 to the other half at the side of the output shaft 2.

As shown in FIG. 2, the input shaft 1 has its one end portion connected to the turbine runner of a torque converter (although neither of the two is shown) and its other end portion formed on a flange portion 30, which is connected to the carrier C0 of the O/D planetary gear set PG0. The sun gear S0 of the O/D planetary gear set PG0 is formed with a cylindrical member 31, which is rotatably fitted on the outer circumference of the input shaft 1. This cylindrical member 31 acts as the inner race of the one-way clutch F0, the drum of the clutch K0, the hub of the brake B0 and the cylinder of the hydraulic servo mechanism for the clutch K0. The outer race of the one-way clutch F0, which is fitted in that cylindrical member 31, is connected to the carrier C0, to which is splined the hub of the clutch K0. In the cylindrical member 31, there is fitted a piston 32 which is moved back and forth toward the friction plates of the clutch K0. Moreover, the brake B0 for fixing the sun gear S0 is constructed by having its alternately arrayed friction plates splined to the outer circumference of the cylindrical member 31 and the inner circumference of the casing 3.

In the vicinity of the O/D planetary gear set PG0, there is arranged a support member 34 which is splined to the inner face of the casing 3 and fixed by a snap ring 33. The support member 34 is formed at its center with a boss portion 35, in which is fitted the intermediate shaft 4. This shaft 4 has a one end portion inserted into and rotatably fitted in the axial quill portion of the input shaft 1 and another end portion rotatably supported on the boss portion 35. Moreover, the ring gear R0 of the O/D planetary gear set PG0 is connected to the intermediate shaft 4 by a disc-shaped connect plate 36 which has its inner and outer circumferences splined to the ring gear R0 and the intermediate shaft 4. Incidentally, the support member 34 holds a piston 37, which is moved back and forth relative to the friction plates of the brake B0, so that its portion constitutes the hydraulic servo mechanism for the brake B0.

On the outer circumference of the boss portion 35 of the support member 34, there is rotatably fitted a cylindrical member 38 for the second clutch K2. This cylindrical member 38 is formed of an inner circumference cylindrical portion fitted on the boss portion 35, an outer circumference cylindrical portion and an radially extending portion called the "bottom plate portion". The friction plates are splined to both the inner face of the cylindrical portion at the outer circumference and a hub portion 39 arranged to face the former portion. In the cylindrical portion 38, there is arranged a piston 40 which is moved back and forth toward those friction plates. Incidentally, the hub portion 39 is fixed on a flange portion 41 which is formed to project radially outward from the end portion of the Intermediate shaft 4. Moreover, a thrust bearing 42 is arranged between the flange portion 41 and the leading end portion of the boss portion 35.

Moreover, the outer circumference of the leading end of the intermediate shaft 4 and a drum portion 43 for the first clutch K1 mounted on the flange portion 41 define a cylinder of a hydraulic servo mechanism for the first clutch K1. A piston 44 for the first clutch K1 is so fitted in this cylinder as to move back and forth in the axial directions. On the other hand, the piston 44 is arranged on its front face with both friction plates, which are splined to the inner face of the drum portion 43, and friction plates which are splined to a hub portion 45 alternately of the former friction plates. This hub portion 45 is also splined to the outer circumference of a flange portion 46 projecting from the connecting shaft 23 arranged in the radially innermost position. Incidentally, this connecting shaft 23 has a one end portion rotatably fitted in the end portion of the intermediate shaft 4 and another portion rotatably fitted in the end portion of the output shaft 2, so that it is aligned on a common axis with respect to the input shaft 1 and the output shaft 2. Moreover, a thrust bearing 47 is arranged between that flange portion 46 and the end portion of the aforementioned intermediate shaft 4. As a result, the thrust to act upon the connecting shaft 23 is received by the casing 3 through the intermediate shaft 4 and the support member 34.

At the opposite side (as located at the righthand side of the drawing) to the first clutch K1 across that flange portion 46, there is arranged the first planetary gear set PG1. This first planetary gear set PG1 has the ring gear R1 connected to the hub portion 45, the carrier C1 connected to the flange portion of the connecting shaft 22 and the sun gear S1 formed on the outer circumference of the sun gear shaft 20. The connecting shaft 22 is a relatively short quill, which is rotatably fitted on the outer circumference of the connecting shaft 23 arranged on the axis. The sun gear shaft 20 is also a quill which is rotatably fitted on the outer circumference of the connecting shaft 22 while connecting the sun gear S1 of the first planetary gear set PG1 and the sun gear S2 of the second planetary gear set PG2.

The first planetary gear set PG1 has its individual gears axially offset from the first clutch K1. Of these gears, the ring gear R1 is connected to the hub portion 45 of the first clutch K1 by a member 48, which is curved toward the inner circumference of the first clutch K1. Thanks to this curved extension of the member 48, the first planetary gear set PG1 is brought close to the first clutch K1 to eliminate the dead space so that the gear shift system can be axially shortened in its entirety.

The aforementioned second clutch K2 has its drum portion 21 extended in the axial direction to cover around the first clutch K1 and the first planetary gear set PG1 so long as to have its end portion splined to the sun gear shaft 20. Around the drum portion 21, there is arranged the first brake B1 of a band brake to act as the first brake means.

Thus, what is positioned in the casing 3 and around the first planetary gear set PG1 is the drum portion 21 of the second clutch K2, and this drum portion 21 can have its shape designed freely to some extent. As a result, the external diameter of the first planetary gear set PG1 is not restricted by many causes but can be easily enlarged. In other words, it is possible to increase the gear ratio of the first planetary gear set PG1 to a high value.

On the other hand, the one-way clutch F1 is arranged to have its inner race positioned adjacent to that portion of the sun gear shaft 20, which is connected to the drum portion 21. Between the outer race of the one-way clutch F1 and the casing 3, there is disposed the second brake B2, for which a hydraulic servo piston 49 is reciprocally fitted in a second support member 50. This second support member 50 is arranged closer to the output shaft 2 than the second brake B2. Specifically, the second support member 50 is formed, in its portion slightly radially externally of the one-way clutch F1, with a cylinder portion 51 which is opened toward the second brake B2. The hydraulic servo piston 49 is so fitted in the cylinder portion 51 as to move back and forth. As a result, the hydraulic servo piston 49 is arranged by exploiting the space around the one-way clutch F1 so that the dead space is reduced to shorten the gear shift system in the axial direction.

At the opposite side to the second brake B2 across the second support member 50, there are arranged the second planetary gear set PG2 and the third planetary gear set PG3. The second planetary gear set PG2 has the sun gear S2 splined to the outer circumference of the end portion of the aforementioned sun gear shaft 20. Around the second planetary gear set PG2, moreover, there is arranged the third brake B3 of a multi-disc brake acting as the third brake means. This third brake B3 has a hub portion 52 connected to the carrier C2 of the second planetary gear set PG2. The hydraulic servo mechanism for applying the third brake B3 has its piston 53 so held in the aforementioned second support member 50 as to move back and forth in the axial directions. As is apparent from the drawings, therefore, what restricts the internal diameter of the piston 53 is either the sun gear shaft 20 or a shaft inserted into the former. As a result, the piston 53 has its internal diameter decreased to have a larger pressure receiving area than that of the servo piston 49 for the second brake B2.

Moreover, the second planetary gear set PG2 has the ring gear R2 splined to the outer circumference of an annular member 54 which has a cylinder portion projecting in the axial direction from its inner and outer circumferences. By splining this annular member 54 to the outer circumference of the end portion of the aforementioned connecting shaft 22, moreover, the ring gear R2 is connected to the carrier C1 of the first planetary gear set PG1 through those annular member 54 and connecting shaft 22. The annular member 54 has an outer circumference toothed to form a parking gear 55. Around this parking gear 55, there is so arranged a parking lock pole 56 as to move up and down of the drawing. This parking lock pole 56 comes into selective engagement with the parking gear 55 to block its rotation.

Figure 4:
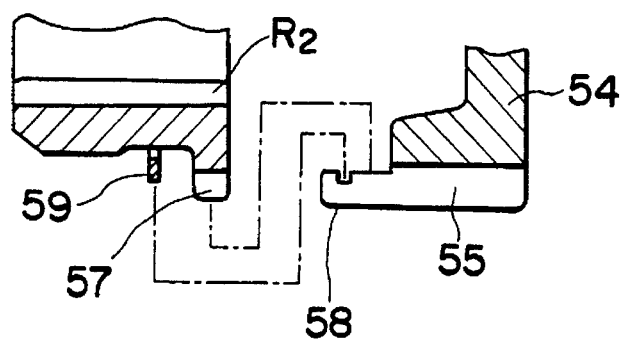
FIG. 4 is a section showing a portion of one example of the assembly structure of the ring gear and parking gear of a third planetary gear set of the gear shift system shown in FIGS. 2 and 3.

Here will be described an assembly structure for assembling the ring gear R2 with the annular member 54. The parking gear 55 has teeth projected toward the second planetary gear set PG2, as shown in an enlarged scale in FIG. 4, and the ring gear R2 is formed in its outer circumference with splines 57 which are given a pitch substantially equal to that of the teeth of the parking gear 55. Thus, the ring gear R2 is integrated In the rotating direction with the parking gear 55 by having its outer circumference splines 57 meshing with the axial projections 58 of the teeth of the parking gear 55. On the other hand, the ring gear R2 is fixed in the axial direction by a snap ring 59.

The third planetary gear set PG3 is arranged close to the second planetary gear set PG2 so that the carrier C3 is connected to the ring gear R2 of the second planetary gear set PG2 and the carrier C1 of the first planetary gear set PG1 by a pinion pin fitted in the aforementioned annular member 54. Moreover, this third planetary gear set PG3 has the carrier C3 integrated with a flange portion 60 of the output shaft 2. Moreover, the sun gear S3 of the third planetary gear set PG3 is splined to the outer circumference of the connecting shaft 23 arranged on the center axis, and its end portion at the side of the input shaft 1 is positioned to receive the thrust by a stopper T which is attached to the connecting shaft 23. As a result, the sun gear S3 is connected to the ring gear R1 of the first planetary gear set PG1.

In order to fix the ring gear R3 of the third planetary gear set PG3, there are provided the fourth brake B4 of a multi-disc brake and the one-way clutch F2. Of these, the fourth brake B4 is interposed between the ring gear R3 and the casing 3 by splining a plurality of friction plates to the outer circumference of the third planetary gear set PG3 and by splining friction plates arranged alternately of the former friction plates to the inner circumference of the casing 3. The hydraulic servo mechanism for applying that fourth brake B4 is of the double chamber type, which has its pistons 61 and 62 so arranged in a cylinder portion as to move back and forth in the axial directions. This cylinder portion is defined by a partition 63 which is projected radially internally from the end portion of the casing 3.

Figure 5:
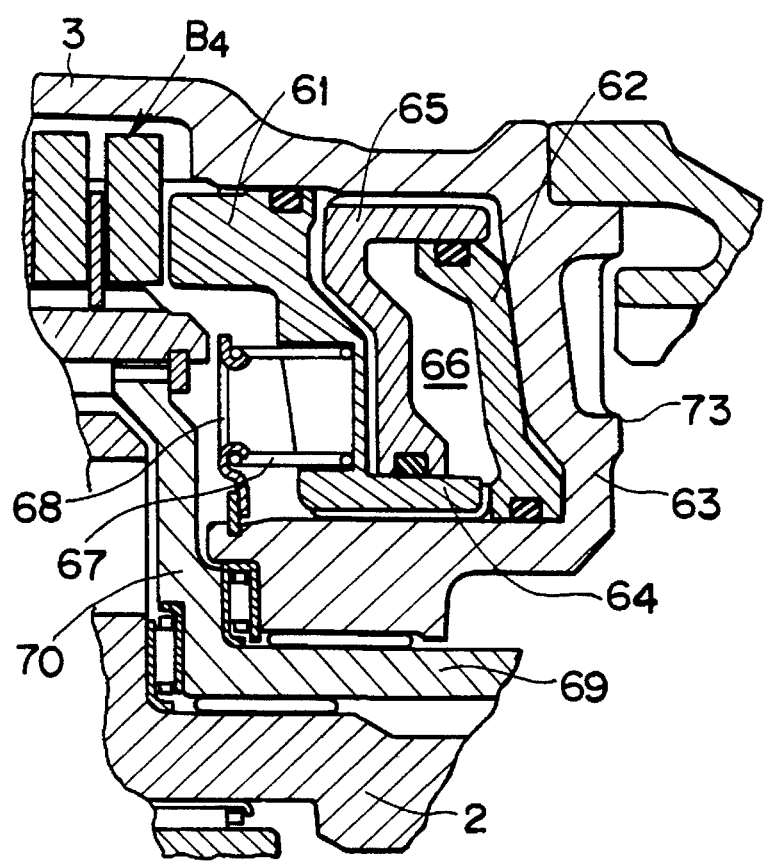
FIG. 5 is a section showing a portion of the double chamber structure of a hydraulic servo mechanism for applying a fourth brake in the gear shift system shown in FIGS. 2 and 3.

The construction of this hydraulic servo mechanism will be more specifically described in the following. As shown in an enlarged scale in FIG. 5, the piston 61 closest to the fourth brake B4 is formed at its inner circumference with a cylindrical boss portion 64 and is in sliding contact with the inner face of the cylinder portion defined by the partition 63. At the back of the piston 61, there is arranged a cylinder member 65 which is in sliding contact with the outer circumference of the boss portion 64 and the inner circumference of the casing 3. The cylinder member 65 is formed with a cylindrical portion projected in the axial direction from its outer circumference. The other piston 62 is in sliding contact with both the inner circumference of that cylindrical portion and the inner circumference of the cylinder portion defined by the partition 63 and is in abutment against the end portion of the aforementioned boss portion 64. Moreover, oil pressure chambers are established at the back sides (as located at the righthand side of the drawing) of the individual pistons 61 and 62, and a space 66 between the righthand piston 62 and the cylinder member 65 is vented to the atmosphere. Incidentally, a return spring 67 is arranged between the lefthand piston 61 and a retainer 68.

To the ring gear R3 of the third planetary gear set PG3, moreover, there is splined a flange portion 70 which is formed at the end portion of a connecting shaft 69 for effecting a connection to the one-way clutch F2. This connecting shaft 69 is so fitted between the aforementioned partition 63 and output shaft 2 as to rotate relative thereto and is projected from the casing 3. To the end portion of the casing 3, on the other hand, there is connected an extension housing 71. The one-way clutch F2 is caused to block the rotation of the ring gear R3 in one direction by splining its outer race 72 to the inner face of the extension housing 71 and its outer race 72a to the outer circumference of the connecting shaft 69. Across the outer race 72 of the one-way clutch F2, there are arranged a boss portion 73 projected from the outer face of the aforementioned partition 63 and a boss portion 74 projected from the inner face of the extension housing 71. These boss portions 73 and 74 position together the outer race 72 in the axial direction.

Incidentally, designated at reference numeral 75 in FIG. 3 is a rotor for a speed sensor, which is splined to the output shaft 2. Between this rotor 75 and the inner race 72a, there is sandwiched a thrust washer 75a for positioning the inner race 72a at the side of the extension housing 71. The positioning of the opposite side is effected by the stopper T which is attached to the connecting shaft 69.

Figures 6, 8:
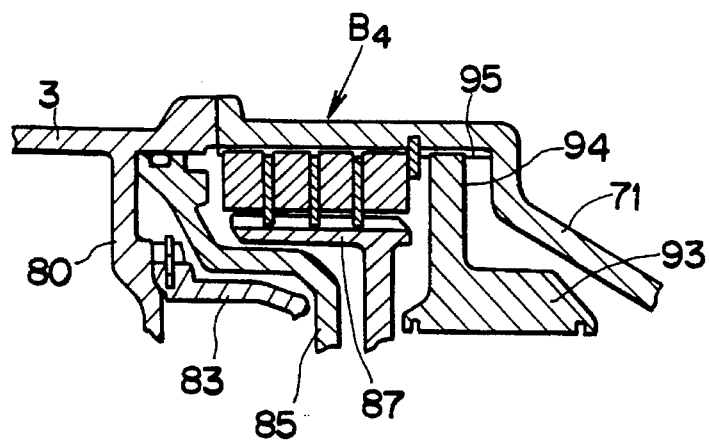
FIG. 6 is a clutch/brake application chart of frictional engage elements for setting a plurality of gear stages in the first embodiment of the present invention.
FIG. 8 is a section showing a portion, as taken at the side of an extension housing, of still another embodiment of the present invention.

The gear shift system thus far described can set gear stages of five forward and one reverse stages, and the individual frictional engage elements for the gear stages follow a clutch/brake application chart, as tabulated in FIG. 6. In FIG. 6: symbols ○ indicate the applied states of the elements: symbols ⊙ indicate the applied states to be taken at the time of engine braking: and blanks indicate the released states of the elements. The individual gear stages will be briefly described in the following.

First of all, at each of the 1st to 4th forward gear stages, the O/D planetary gear set PG0 takes the so-called "direct-connected state", in which it is integrally rotated in its entirety with its clutch C0 being applied. At the 1st speed, moreover, the first clutch K1 and the second one-way clutch F2 come into engagement. With the ring gear R3 of the third planetary gear set PG3 being fixed, therefore, the power is inputted to the sun gear S3 from the first clutch K1 so that its torque is amplified according to the gear ratio of the third planetary gear set PG3, until it is outputted from the carrier C3 to the output shaft 2. Since, at this 1st speed, the second one-way clutch F2 is fixed by the ring gear R3 of the third planetary gear set PG3, the fourth brake B4 in parallel relation to the second one-way clutch F2 is applied so as to effect the engine braking.

At the 2nd speed, not only the first clutch K1 but also the third brake B3 is applied. As a result, the input is fed from the sun gear S2 of the second planetary gear set PG2 from the sun gear S1 of the first planetary gear set PG1, and the output is fed from the ring gear R2 by using as a reaction member the carrier C2 which is fixed by the third brake B3. The input is fed to the carrier C3 of the third planetary gear set PG3 from the carrier C1 of the first planetary gear set PG1 so that the torque from the carrier C1 of the first planetary gear set PG1 and the torque from the ring gear R2 of the second planetary gear set PG2 are summed and outputted to the output shaft 2.

At the 3rd speed, not only the first clutch K1 but also the second brake B2 is applied, and the first one-way clutch F1 is applied. As a result, the input is fed to the ring gear R1 of the first planetary gear set PG1 with the sun gear S1 being fixed by the second brake B2 and the first one-way clutch F1, so that the torque amplified according to the gear ratio of the first planetary gear set PG1 is outputted to the carrier C1 and the output shaft 2 which is connected to the carrier C1 through the carrier C3 of the third planetary gear set PG3. Since, in this case, the sun gear S1 of the first planetary gear set PG1 is fixed through the one-way clutch F1, the first brake B1 in parallel to the one-way clutch F1 is applied to effect the engine braking.

At the 4th speed, the first and second clutches K1 and K2 are applied. As a result, the first planetary gear set PG1 is rotated in its entirety, and the torque is transmitted from the carrier C1 to the output shaft 2 so that the input torque is outputted as it is. This establishes the direct-connected state.

At the 5th speed, moreover, the O/D planetary gear set PG0 is brought into the overdrive state with the first and second clutches K1 and K2 being applied. Specifically, the brake B0 is applied, but the clutch K0 is released. As a result, the gear train composed of the first to third planetary gear sets PG1 to PG3 in the direct-connected state transmits the rotation, which has been accelerated by the O/D planetary gear set PG0, without any change to the output shaft 2.

At the reverse stage, the second clutch K2 and the fourth brake B4 are applied with the carrier C0 and the sun gear S0 of the O/D planetary gear set PG0 being connected through the clutch K0 and integrated in its entirety. As a result, the first planetary gear set PG1 receives the input at the sun gear S1 so that the carrier C1 and ring gear R1 feed their outputs according their sharing ratio. Incidentally, the carrier C1 and the ring gear R1 are reversed (to rotate in the opposite direction to that of the input shaft 1). In the third planetary gear set PG3, on the other hand, the input is fed to the sun gear S3 from the carrier C1 of the first planetary gear set PG1 with the ring gear R3 being fixed, so that the carrier C3 produces the torque which is amplified according to the gear ratio of the third planetary gear set PG3. In short, the output shaft 2 outputs the sum of the torque transmitted from the sun gear S1 of the first planetary gear set PG1 and the torque amplified by the third planetary gear set PG3. At this reverse stage, the sun gear S1 of the first planetary gear set PG1 acts as an input element to receive a high thrust, and the connecting shaft 23 connected to the third planetary gear set PG3 also receives a thrust. Since, however, this connecting shaft 23 is axially supported by the support member 34 through the thrust bearings 47 and 42, the load upon the thrust bearing supporting the aforementioned sun gear S1 can be reduced to has a smaller capacity.

Thus, the gear shift system described above has the O/D planetary gear set PG0 held in the direct-connected state even at the reverse stage. This direct connection is achieved by giving the higher gear ratios to the planetary gear sets PG1 and PG2, because the first and second planetary gear sets PG1 and PG2 are freed or released from the restrictions on their external diameters as the individual planetary gear sets PG1 to PG3 are arranged, as shown in FIGS. 2 and 3. Specifically, in order to give a higher gear ratio to the reverse stage, the first planetary gear set PG1 may given a higher gear ratio. This change would, however, raise the gear ratio for the 2nd speed close to that of the 1st speed. In order to prevent this, the gear shift system described above holds the gear ratio of the 2nd speed at an intermediate proper value between the gear ratios of the 1st speed and the 3rd speed, by giving a higher gear ratio to the second planetary gear set PG2 because the external diameter of the 2nd planetary gear set PG2 is not seriously restricted.

In the construction described above, moreover, the second one-way clutch F2 having a parallel relation to the fourth brake B4 is arranged in the extension housing 71. As a result, the hydraulic servo mechanism including the piston 61 for applying the fourth brake B4 can be arranged to face the fourth brake B4 directly and can be constructed of the so-called "double chamber type", as shown. As a result, the hydraulic servo mechanism raises no cause for increasing the external diameter so that the gear shift system can be diametrically small-sized in its entirety.

Figure 7:
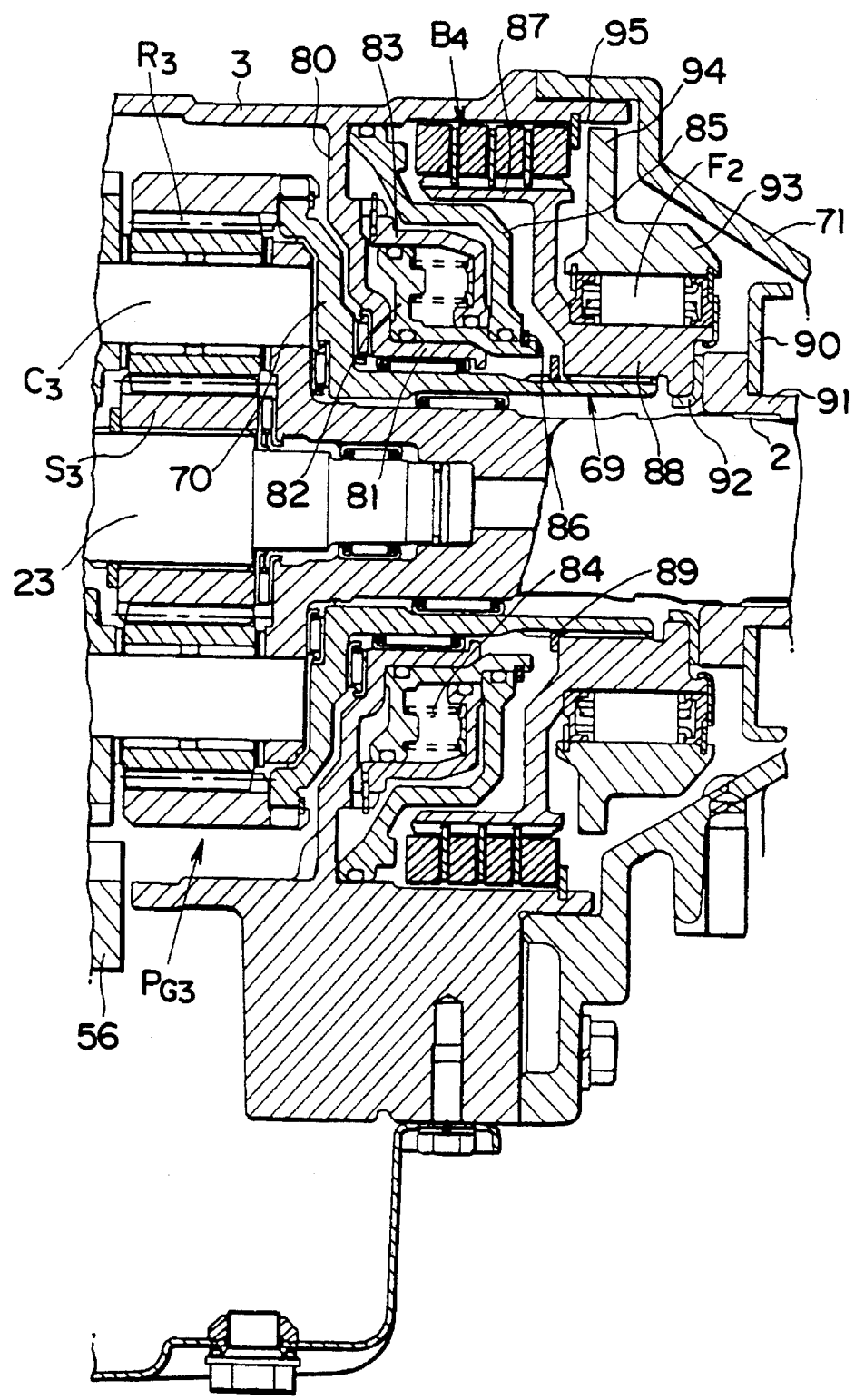
FIG. 7 is a section showing a hydraulic servo mechanism for a fourth brake in another embodiment of the present invention.

Incidentally, the present invention should not be limited to the foregoing embodiment but can be improved in various manners without changing the array of the individual planetary gear sets PG0 to PG3, as will be exemplified in FIG. 7.

In this embodiment, the fourth brake B4 of a multi-disc brake acting as the fourth brake means and the second one-way clutch F2 are arranged outside of the casing 3 but in the extension housing 71. Specifically, a partition 80 for partitioning the end portion of the casing 3 is formed after and close to the flange portion 70 of the connecting shaft 69 and is formed at its inner circumference with a boss portion 81 projected toward the extension housing 71. Between the boss portion 81 and the projection of the casing 3, there is formed a cylinder portion, in which is disposed a double-chamber type hydraulic servo mechanism.

A first piston 82 in this hydraulic servo mechanism is formed at the inner circumference, as shown, with a boss portion which is largely projected in the axial direction. This boss portion is so liquid-tight fixed on the outer circumference of the boss portion 81 of the aforementioned partition 80 as to move back and forth. On the outer face (as located at the righthand side of the drawing) of the partition 80, moreover, there, is mounted integrally with the casing 3 a cylinder member 83 which has its inner circumference end held in liquid-tight sliding contact with the outer circumference of the boss portion of the first piston 82 and the cylindrical portion held at the inner circumference in liquid-tight contact with the outer circumference of the first piston 82. The cylinder member 83 is projected toward the extension housing 71 and is equipped therein with a return spring 84 for returning the first piston 82.

On the end of the boss portion of the first piston 82 leading from a portion fitted in the aforementioned cylinder member 83, there is liquid-tight fitted a second piston 85 which is fixed with respect to the first piston 82 by a snap ring 86. Moreover, the second piston 85 has an outer circumference held in liquid-tight sliding contact with the inner circumference of the casing 3. Oil pressure chambers are defined between the first piston 82 and the partition 80 and between the second piston 85 and the cylinder member 83. On the other hand, the space defined between the first piston 82 and the cylinder member 83 and arranged with the return spring 84 is vented to the atmosphere.

In the leading side (as located at the righthand side of the drawing) of the second piston 85, there are arranged both a plurality of friction plates splined to the inner face of the casing 3 and other friction plates arrayed alternately with respect to the former friction plates. The latter friction plates are splined to the outer circumference of a cylindrical brake hub 87 to provide the fourth brake B4 of a multi-disc brake. The brake hub 87 is integrated with the inner race 88 of the second one-way clutch F2 which is splined to the outer circumference of the leading end portion of the aforementioned connecting shaft 69. The inner race 88 is axially positioned by a snap ring 89 fitted on the connecting shaft 69, and a sleeve 91 and a washer 92 fixing a speed sensor rotor 90 on the output shaft 2. Moreover, the one-way clutch F2 has its outer race 93 formed with a plurality of radially outward projections 94 which are arranged at a circumferentially constant pitch. These projections 94 are made to engage with splines 95 which are formed in the end portion of the casing 3.

In the construction shown in FIG. 7, therefore, the fourth brake B4, the second one-way clutch F2 and the hydraulic servo mechanism for applying the fourth brake B4 are assembled from the side of that end portion of the casing 3, to which is attached the extension housing 71. In this case, the assembly is carried out in the shallow portion so that it can be facilitated to provide an excellent workability.

Since, moreover, no gear is present in the portion where the fourth brake B4 to be applied mainly For the reverse stage is accommodated, no much lubricating oil is supplied at all times. As a result, no excessive lubricating oil will invade into the clearances between the friction plates so that the drag loss of the fourth brake B4 at the forward stages can be reduced to improve the power performance and the mileage advantageously.

Incidentally, in the embodiment shown in FIG. 7, the reactions of the fourth brake B4 and the one-way clutch F2 are received by the casing 3 but may be modified to be received by the extension housing 71. This modification is exemplified in FIG. 8. With this modified construction, the extension housing 71 can be diametrically small-sized.

Figure 9:
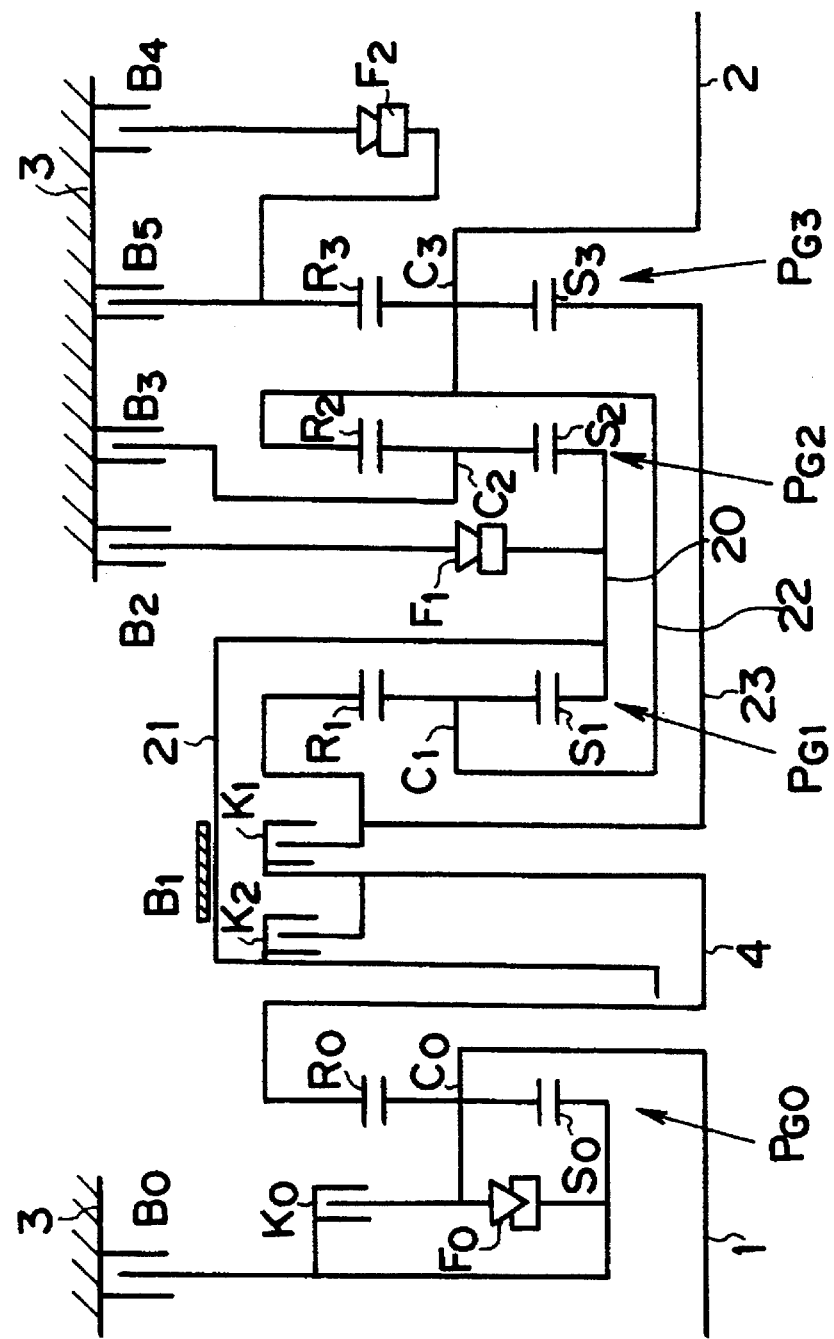
FIG. 9 is a skeleton diagram showing a further embodiment of the present invention.

Still another embodiment of the present invention will be described with reference to FIG. 9 presenting a skeleton diagram of a gear train. In this embodiment, the fourth brake means in the gear shift system described above is improved. In the foregoing gear shift system, more specifically, the fourth brake means for fixing the ring gear R3 of the third planetary gear set PG3 is constructed to include the second one-way clutch F2 and the fourth brake B4 of a multi-disc brake arranged in parallel to the former. In the embodiment shown in FIG. 9, the second one-way clutch F2 and the fourth brake B4 are arrayed in a series relation to each other and in a parallel relation to a fifth brake B5 of a multi-disc brake for fixing the ring gear R3 selectively.

Figures 10, 11:
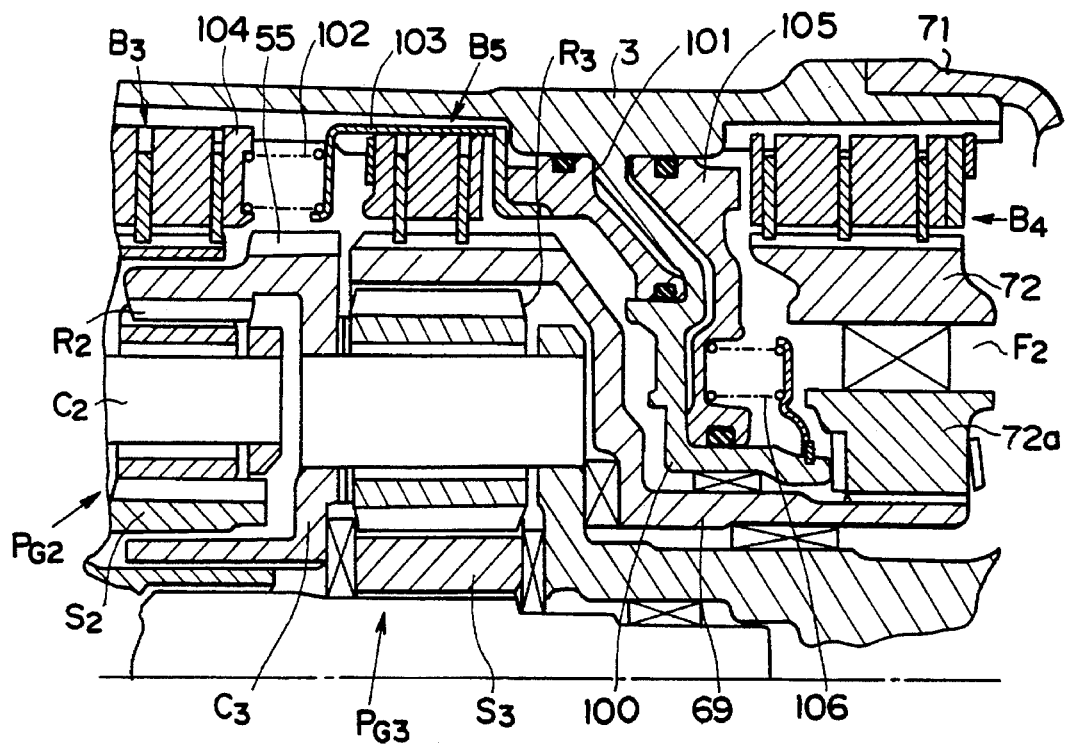
FIG. 10 is a section showing a portion of the system of FIG. 9 more specifically.
FIG. 11 is a clutch/brake application chart of frictional engage elements for setting a plurality of gear stages in the gear shift system shown in FIG. 9.

FIG. 10 is a section showing a portion of the gear shift system specifying the construction shown in FIG. 9. At the back side (as located at the righthand side of the drawing) of the casing 3 backward of the third planetary gear set PG3, there is formed a partition 100 which is projected toward the output shaft 2. At the bask side across this partition 100, there are arranged the second one-way clutch F2 and the fourth brake B4. On the other hand, the fifth brake B5 is arranged around the third planetary gear set PG3, as located at the front end side (or at the engine side) leading from the partition 100.

This fifth brake B5 is constructed like the fourth brake B4 of FIG. 3 by splining friction plates to the outer circumference of a brake hub of the ring gear R3 of the third planetary gear set PG3 and by fitting such other friction plates, which are arranged alternately with the former friction plates, to the innercircumference of the casing 3. In a cylinder portion formed in the aforementioned partition 100, there is reciprocally fitted a piston 101 for pushing those friction plates into frictional contact (or engagement). A return spring 102 for the piston 101 is arranged around the aforementioned parking gear 55. Specifically, the piston 101 is equipped at the leading end portion with a seat 103 having a C-shaped section, which extends to the outside of the parking gear 55 through the outer circumference of the fifth brake B5. An end plate 104 of the third brake B3 facing the leading end portion of that seat 103 is fixed in the casing 3. The return spring 102 is compressed between the end plate 104 and the leading end portion of the seat 103 to urge the piston 101 elastically through the seat 103.

On the other hand, the end portion of the connecting shaft 69, which is integrated with the ring gear R3 of the third planetary gear set PG3, is extended to the trailing end side of the casing 3 through the inner circumference side of the aforementioned partition 100. To the outer circumference of the end portion of the connecting shaft 69, there is splined the inner race 72a of the second one-way clutch F2. The outer race 72 of this second one-way clutch F2 acts as the hub of the fourth brake B4. Friction plates are splined to the outer circumference of the outer race 72, and other friction plates are splined to the inner circumference of the casing 3 while being arranged alternately with the former friction plates. A piston 105 for pushing these friction plates into frictional contact (or engagement) 1s reciprocally fitted in a cylinder portion which is formed in the partition 100 at the side opposed to the portion fitting the piston 101 for the fifth brake B5. Incidentally, designated at reference numeral 106 is a return spring for the piston 101. The remaining construction is similar to that shown in FIGS. 2 and 3, and its description is omitted by adding the common reference numerals.

This gear shift system, as shown in FIGS. 9 and 10, is enabled to set the gear stages of five forward and one reverse stages by applying the individual frictional engage elements, as tabulated in FIG. 11. As will be apparent by comparing FIG. 11 with FIG. 6, the gear shift system shown in FIGS. 9 and 10 is different from the foregoing gear shift system in the frictional engage elements to be applied at the speed and at the reverse stage, which will be briefly described in the following.

The 1st speed is set by bringing the O/D planetary gear set PG0 into the so-called "direct-connected state", that is, by applying the one-way clutch F0 after the clutch K0. On the contrary, the first to third planetary gear sets PG1 to PG3 are set to the 1st speed states. Specifically, the second one-way clutch F2 is applied after the first clutch K1 and the fourth brake B4. As a result, with the ring gear R3 of the third planetary gear set PG3 being fixed, the sun gear S3 is rotated together with the input shaft 1 so that the power is decelerated and transmitted to the output shaft 2. Thus, since the 1st speed is set by applying the second one-way clutch F2, the fifth brake B5 in parallel to the second one-way clutch F2 is applied in case the engine braking is to be effected.

In case the reverse stage is to be set, on the other hand, the clutch K0 of the O/D planetary gear set PG0 and the second clutch K2 are applied together with the third brake B3. As a result, the power is inputted to the sun gear S2 of the second planetary gear set PG2 with the carrier C2 of the same being fixed, so that the ring gear R2 and the output shaft 2 connected to the former are decelerated from the input shaft 1 and rotated in the opposite direction. Thus, the reverse stage is set by the reversing and decelerating actions of the second planetary gear set PG2, and the gear ratio takes a value lower than that of the reverse stage of the gear shift system of the foregoing embodiments. However, the gear ratio obtained is enabled to provide a necessary and sufficient driving force by setting the gear ratio of the second planetary gear set PG2 properly.

In the gear shift system constructed as shown in FIGS. 9 and 10, therefore, at a forward gear stage other than that of the 1st speed, the ring gear R3 of the third planetary gear set PG3 is rotated in the same direction as that of the input shaft 1 while the second one-way clutch F2 being released, so that the drag loss due to the idle rotation of the fourth brake B4 can be prevented. Moreover, the fifth brake B5 is directly connected to the ring gear R3 so that it is idly rotated when in an operation other than that for the engine braking at the 1st speed. Since, however, the fifth brake B5 is given a small capacity for effecting the engine braking, it reduces the drag torque due to the idle rotations.

In the present invention, on the other hand, the one-way clutch or multi-disc brake arranged in the extension housing should not be limited to that for fixing the ring gear but may be any for fixing any rotating element of the planetary gear set arranged at the end portion of the casing.

Here will be synthetically described the advantages to be obtained by the present invention. In the gear shift system of the present invention, of the one-way clutch and the multi-disc brake for fixing the predetermined rotating element of the planetary gear set arranged at the end portion of the casing, at least the one-way clutch is accommodated in the extension housing so that the interference between the hydraulic servo mechanism for applying the multi-disc brake and the one-way clutch can be avoided. As a result, the causes for increasing the diametrical size can be eliminated to reduce the diametrical size of the gear shift system thereby to make it small-sized and light.

If the construction is made such that the multi-disc brakes are also arranged in the extension housing, the lubricating oil to be fed to the planetary gear sets falls to reach the multi-disc brakes. This makes it possible to prevent an excess amount of lubricating oil fed to the multi-disc brakes and an according rise of the drag torque thereby to prevent the power loss and the reduction of mileage.

In the gear shift system according to the present invention, moreover: the first planetary gear set and the second planetary gear set having their sun gears connected to each other and their carriers and ring gears connected to each other are arrayed in the recited order from the side of the input shaft; the third planetary gear set having its carrier connected to the ring gear of the second planetary gear set and the sun gear connected to the ring gear of the first planetary gear set is arranged adjacent to the second planetary gear set and opposed to the first planetary gear set; the first clutch means for the input to the ring gear of the first planetary gear set is arranged adjacent to the first planetary gear set and at the side of the input shaft; the second clutch means for the input of the sun gear of the first planetary gear set is arranged adjacent to the first clutch means and at the side of the input shaft; and the servo mechanisms for the second brake means for fixing the sun gears of the first planetary gear set and the second planetary gear set selectively and the third brake means for fixing the carrier of the second planetary gear set selectively are arranged between the first planetary gear set and the second planetary gear set. Thus, the gear shift system is not elongated in its whole length and is left less causes for restricting the diametrical sizes of the first planetary gear set and the second planetary gear set. As a result, these planetary gear sets can be given higher gears to raise the gear ratio of the reverse stage without any drastic change in the gear ratio for the 2nd speed. Thus, the O/D planetary gear set can be brought into the direct-connected state at the reverse stage so that the gear change can be easily controlled.

If the gear shift system is constructed such that the radially innermost connecting shaft connected to the sun gear of the third planetary gear set is supported in the axial direction through the thrust bearing by the support portion integrated with the casing, the bearing supporting the sun gear of the first planetary gear set in the axial direction can be small-sized to make the entire construction compact.

If, moreover, the fourth brake means is composed of the multi-disc brake, the one-way clutch in parallel to the former and the multi-disc brake in series relation to the same, it is possible to provide a gear shift system which has an excellent power transmission efficiency by reducing the drag loss of the brakes. Since, moreover, these multi-disc brakes are separately accommodated in the casing and the extension housing and since the pistons for the individual multi-disc brakes are held in the wall portions at the end of the casing, the entire construction of the fourth brake means and the hydraulic servo mechanism for the fourth brake means can be simplified to reduce the overall size and weight of the gear shift system.

What is claimed is:

1. A gear shift system for an automatic transmission, in which a plurality of planetary gear sets arrayed on a common axis and each including a plurality of rotating elements are arranged in a casing, and in which an extension housing is attached to the axial end portion of said casing, comprising:

a one-way clutch arranged in said extension housing for selectively fixing the rotating elements of a predetermined one of said planetary gear sets arranged at the end side of said casing;

a multi-disc brake in a parallel relation to said one-way clutch;

a hydraulic servo mechanism for applying said multi-disc brake selectively;

a partition formed on the inner face of the end portion of said casing and extended toward a center of the casing, wherein said multi-disc brake includes: first friction plates so connected to a rotating element of said predetermined planetary gear as to rotate together; and second friction plates arranged to face said first friction plates and irrotationally engaging with said casing, and wherein said hydraulic servo mechanism includes a piston fitted reciprocally movably in said partition and actuated by an oil pressure for pushing said first friction plates and said second friction plates into frictional contact with each other.

2. A gear shift system for an automatic transmission according to claim 1, wherein said one-way clutch includes: an inner race member connected to a rotating element of said predetermined planetary gear set; and an outer race member made rotatable only in one predetermined direction relative to said inner race member and engaging irrotationally with said extension housing.

3. A gear shift system for an automatic transmission according to claim 1, wherein said multi-disc brake is arranged in said extension housing.

4. A gear shift system for an automatic transmission for changing the ratio of numbers of revolutions of an input shaft and output shaft, which are arrayed on a common axis, by a plurality of planetary gear sets arranged between said input shaft and said output shaft, comprising:

a first planetary gear set of single pinion type arranged close to said input shaft and including a sun gear, a ring gear and a carrier;

a second planetary gear set of single pinion type arranged at the opposite side to said input shaft with respect to said first planetary gear set and including a sun gear, a ring gear and a carrier;

a third planetary gear set arranged close to said output shaft than said second planetary gear set and including a sun gear, a ring gear and a carrier connected to said output shaft;

a first connecting shaft arranged on the same axis as that of said input shaft and said output shaft and integrally connecting the sun gear of said third planetary gear set and the sun gear of said first planetary gear set;

a second connecting shaft made of a quill arranged concentrically around said first connecting shaft and integrally connecting the carrier of said first planetary gear set and the ring gear of said second planetary gear set;

a third connecting shaft made of a quill arranged concentrically around said second connecting shaft and integrally connecting the sun gear of said first planetary gear set and the sun gear of said second planetary gear set;

first clutch means arranged closer to said input shaft than said first planetary gear set for connecting the ring gear of said first planetary gear set and said input shaft selectively;

second clutch means arranged closer to said input shaft than said first planetary gear set for connecting the sun gear of said first planetary gear set and said input shaft selectively;

first brake means for braking the rotations of the sun gear of said first planetary gear set and the sun gear of said second planetary gear set selectively;

second brake means for braking the rotations of said sun gears selectively in a predetermined direction;

third brake means for braking the rotation of the carrier of said second planetary gear set selectively; and fourth brake means for braking the rotation of the ring gear of said third planetary gear set selectively.

5. A gear shift system for an automatic transmission according to claim 4, further comprising:

a casing covering the entire outer circumference of said gear shift system and having a support portion projected toward a center axis of said first connecting shaft; and a thrust bearing arranged between one end portion of said first connecting shaft and said support means for supporting said first connecting shaft in the axial direction thereof.

6. A gear shift system for an automatic transmission according to claim 4, wherein said fourth brake means includes: a first multi-disc brake; a one-way clutch arranged in parallel to said first multi-disc brake; and a second multi-disc brake arrayed in series to said one-way clutch.

7. A gear shift system for an automatic transmission according to claim 6, further comprising:

a casing accommodating said individual planetary gear sets;

a wall portion projected toward the center axis from the end portion of said casing at the side of said third planetary gear set;

an extension housing connected to the end portion of said casing;

a first piston so fitted in the portion of said wall portion directed toward an inner face of said casing as to move back and forth in the axial directions of said casing; and a second piston so fitted in the portion of said wall portion directed toward an inner face of said extension housing as to move back and forth in the axial directions of said extension housing, wherein said first multi-disc brake is arranged in a position to face said first piston whereas said second multi-disc plate is arranged in said extension housing in a position to face said second piston.

8. A gear shift system for an automatic transmission, in which a plurality of planetary gear sets arrayed on a common axis and each including a plurality of rotating elements are arranged in a casing, and in which an extension housing is attached to the axial end portion of said casing, comprising:

a one-way clutch arranged in said extension housing for selectively fixing the rotating elements of a predetermined one of said planetary gear sets arranged at the end side of said casing;

a multi-disc brake arranged in said extension housing in a parallel relation to said one-way clutch;

a hydraulic servo mechanism for applying said multi-disc brake selectively;

a partition formed on the inner face of the end portion of said casing and extended toward a center of the casing, wherein said multi-disc brake includes: first friction plates so connected to a rotating element of said predetermined planetary gear set as to rotate together; and second friction plates arranged to face said first friction plates and irrotationally engaging with said casing, and wherein said hydraulic servo mechanism includes a piston fitted reciprocally movably in said partition and actuated by an oil pressure for pushing said first friction plates and said second friction plates into frictional contact with each other.

9. A gear shift system for an automatic transmission according to claim 8, wherein said hydraulic servo mechanism further includes another piston for pushing the first-named piston.

* * * * *